H. M. SCHRECKENGAST.
CORN SHOCKING HORSE.
APPLICATION FILED SEPT. 26, 1917.
1,251,428.
Patented Dec. 25, 1917.
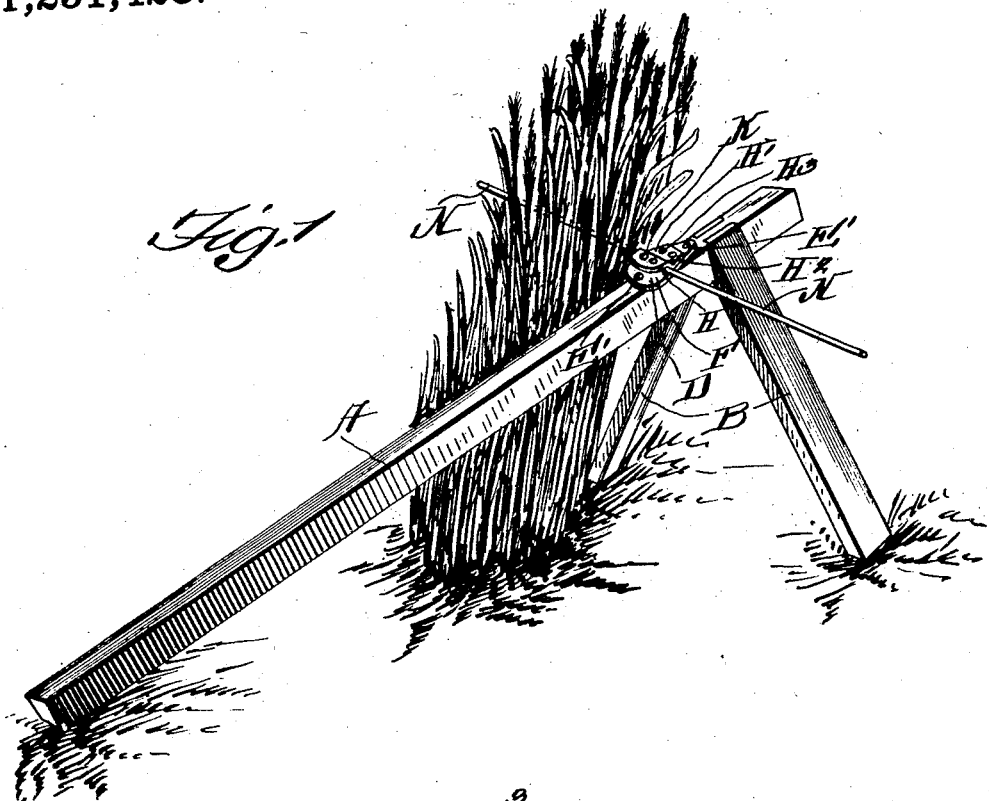
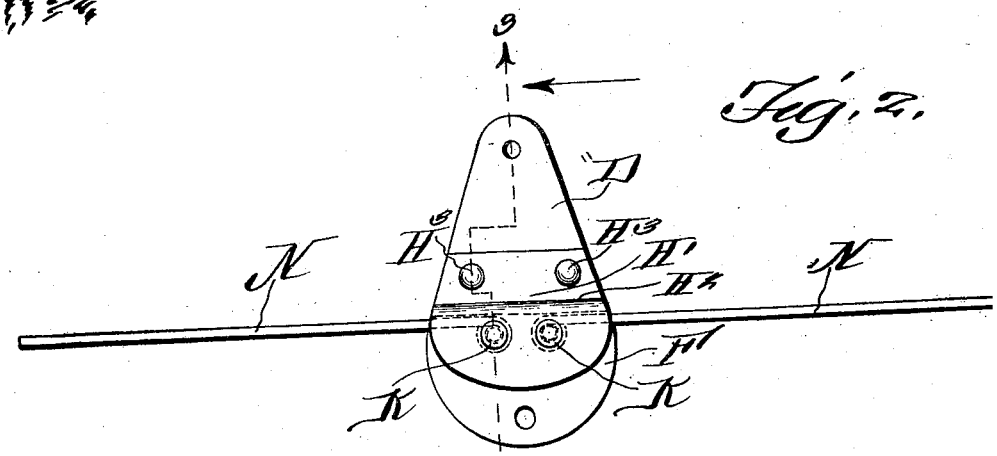

UNITED STATES PATENT OFFICE.

HARRY M. SCHRECKENGAST, OF AVIS, PENNSYLVANIA.

CORN-SHOCKING HORSE.

1,251,428.  Specification of Letters Patent.  Patented Dec. 25, 1917.

Application filed September 26, 1917.  Serial No. 193,346.

*To all whom it may concern:*

Be it known that I, HARRY M. SCHRECKENGAST, a citizen of the United States, residing at Avis, in the county of Clinton and State of Pennsylvania, have invented certain new and useful Improvements in Corn-Shocking Horses; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in corn shocking horses and consists essentially in the provision of a device of this nature which may be applied to any ordinary horse and affords means whereby the stalk supporting arms may automatically swing toward each other to permit the horse to be released from the shock when formed.

The invention comprises various details of construction, combinations and arrangements of parts which will be hereinafter fully described and then specifically defined in the appended claim.

My invention is illustrated in the accompanying drawings, in which:

Figure 1 is a top plan view of my improved corn shocking horse,

Fig. 2 is a plan view, and

Fig. 3 is a sectional view on line 3—3 of Fig. 2.

Reference now being had to the details of the drawings by letters:

A designates the horse of the usual construction, having supporting legs B at one end while the other end is adapted to rest upon the ground. A plate, designated by letter D, made preferably of cast metal is secured to the horse by means of a bolt E', or other suitable fastening means. Said plate has a widened portion F and is provided with a horizontal slot H, the bottom wall of which projects beyond the upper wall thereof. Pivotal pins, designated by letter K, span the slot and upon which the inner circular-outlined ends of the arms N are pivoted. Said arms, when at their farthest limits in one direction, are in alinement with each other, the limits of their movements in one direction being determined by the bottom or end wall of the recess or slot in said plate. Said round ends will tend to contact with and steady the arms when they are swung from closed to open positions.

In operation, the arms are swung to their outer limits for use and the stalks forming the shock leaned against said arms and, when the shock is formed, the horse may be drawn longitudinally in one direction and the arms automatically swung and drawn away from the shock.

By the provision of a device made in accordance with my invention, it will be noted that a simple and efficient means is provided which may be easily and quickly applied to any shocking horse by merely attaching the same to the horse in the manner shown.

What I claim to be new is:

An attachment for shocking horses, comprising two plates fastened together, one of said plates being adapted to be secured to the horse, and the other plate bent at an angle having a free portion parallel to the plate which is secured to the horse, pins passing through registering apertures in the two plates, arms pivotally mounted upon said pins, said arms being adapted to rest upon the upper surface of the under plate and held at their outer limits by the angled portion of said plate in alinement with each other.

In testimony whereof I hereunto affix my signature in presence of two witnesses.

HARRY M. SCHRECKENGAST.

Witnesses:
 LESTER BARNES,
 F. W. THOMAS.

*Copies of this patent may be obtained for five cents each, by addressing the "Commissioner of Patents, Washington, D. C."*